(12) United States Patent
Le Dinh

(10) Patent No.: US 7,076,113 B2
(45) Date of Patent: Jul. 11, 2006

(54) APPARATUS AND METHOD FOR ADAPTIVE SPATIAL SEGMENTATION-BASED NOISE REDUCING FOR ENCODED IMAGE SIGNAL

(75) Inventor: Chon Tam Le Dinh, Montreal (CA)

(73) Assignee: Miranda Technologies Inc., St. Laurent (CA)

( * ) Notice: Subject to any disclaimer, the term of this patent is extended or adjusted under 35 U.S.C. 154(b) by 306 days.

(21) Appl. No.: 10/731,120

(22) Filed: Dec. 10, 2003

(65) Prior Publication Data

US 2004/0120597 A1 Jun. 24, 2004

Related U.S. Application Data

(63) Continuation of application No. PCT/CA02/00887, filed on Jun. 12, 2002.
(60) Provisional application No. 60/297,247, filed on Jun. 12, 2001.

(51) Int. Cl.
*G06K 9/40* (2006.01)

(52) U.S. Cl. .................. 382/261; 382/226; 382/232; 348/666; 348/420.1; 375/240.2; 375/240.24; 358/462

(58) Field of Classification Search .......... 382/261, 382/243, 260, 232, 254, 226, 263, 266, 275, 382/228, 224; 348/631, 666, 420.1, 609, 348/620, 712, 607; 358/447, 463, 402; 375/240.02, 375/240.29, 240.68, 240.12, 240.24, 240.22, 375/240.25

See application file for complete search history.

(56) References Cited

U.S. PATENT DOCUMENTS

| | | | | |
|---|---|---|---|---|
| 5,237,410 A | * | 8/1993 | Inoue | 375/240.12 |
| 5,329,311 A | * | 7/1994 | Ward et al. | 348/180 |
| 5,400,082 A | * | 3/1995 | Kamiya | 348/619 |
| 5,610,729 A | | 3/1997 | Nakajima | |
| 5,852,475 A | | 12/1998 | Gupta et al. | |
| 5,920,356 A | | 7/1999 | Gupta et al. | |
| 6,064,776 A | | 5/2000 | Kikuchi et al. | |
| 6,577,679 B1 | * | 6/2003 | Apostolopoulos | 375/240.12 |

FOREIGN PATENT DOCUMENTS

WO  WO 02/01855 A  1/2002

OTHER PUBLICATIONS

Sun X Z et al: "Adaptive Filters Based on Local Estimates", 1988 IEEE International Symposium on Circuits and Systems. Proceedings (Cat. No. 88CH2458-8), Espoo, Finland, Jun. 7–9, 1988, pp. 2549–2552 vol. 3, XP01069435 1988, New York, NY, USA, IEEE, USA. Abstract.

(Continued)

*Primary Examiner*—Bhavesh M. Mehta
*Assistant Examiner*—Sheela Chawan
(74) *Attorney, Agent, or Firm*—Ogilvy Renault LLP

(57) ABSTRACT

An efficient and non-iterative post processing method and system is proposed for mosquito noise reduction in DCT block-based decoded images. The post-processing is based on a simple classification that segments a picture in multiple regions such as Edge, Near Edge, Flat, Near Flat and Texture regions. The proposed technique comprises also an efficient and shape adaptive local power estimation for equivalent additive noise and provides simple noise power weighting for each above cited region. An MMSE or MMSE-like noise reduction with robust and effective shape adaptive windowing is utilized for smoothing mosquito and/or random noise for the whole image, particularly for Edge regions. Finally, the proposed technique comprises also, for chrominance components, efficient shape adaptive local noise power estimation and correction.

40 Claims, 8 Drawing Sheets

OTHER PUBLICATIONS

Lee Y-L et al: "Loop Filtering and Post-Filtering for Low-Bit-Rates Moving Picture Coding". Signal Processing, Image Communication, Elsevier Science Publishers, Amsterdam, the Netherlands, vol. 16, No. 9, Jun. 2001, pp. 871–890, XP004245273. ISSN: 0923–59652. p. 883, para. 3.3.2.

Bhaskar Ramamurthi et al: "Nonlinear Space-Variant Post-processing of Block Coded Images", IEEE Transactions on Acoustics, Speech and Signal Processing, IEEE Inc. New York, U.S., vol. 34, No. 5, Oct. 1, 1986, pp. 1258–1268, XP00349257. ISSN 0096–3518. Whole document.

Lee J-S: "Digital Image Smoothing and the Sigma Filter". Computer Vision Graphics and Image Processing, Academic Press, Duluth, MA, U.S., vol. 24, 1983, pp. 255–269, XP000199489. Whole document.

* cited by examiner

APPARATUS AND METHOD FOR ADAPTIVE SPATIAL SEGMENTATION-BASED NOISE REDUCING FOR ENCODED IMAGE SIGNAL

This application is a continuation of PCT/CA02/00887, filed on Jun. 12, 2002 which claims benefit of 60/297,247 filed Jun. 12, 2001.

BACKGROUND OF THE INVENTION

1. Field of the Invention

The invention relates to image noise reduction techniques primarily operable in real-time by apparatus and methods for reducing the correlated noise in an image or a sequence of images. More particularly, the invention relates mainly to spatial adaptive techniques for mosquito noise reduction in Discrete Cosine Transform (DCT) based decoded image applications.

2. Description of the Prior Art

Recently, many international standards for still image and video compression such as the ITU-T H261, H263, and the ISO JPEG, MPEG-1, MPEG-2 standards have mainly proposed the block based Discrete Cosine Transform (DCT) as a possible compression technique.

At low and moderate bit rates, block-based DCT coding artifacts become perceptible. Such artifacts are known as mosquito noise or ringing noise occurring around edges within an image or near a smooth zone as well as the blocking effect. For still pictures or still parts of image, the blocking effect is dominant and visible in smooth regions. For dynamic video sequences, mosquito noise becomes more evident for the human vision system (HVS) than the blocking effect.

There are many existing techniques for blocking effect reduction. In H. Reeve and J. Lim, "Reduction of blocking effects in image coding", Optical Engineering, vol. 23, January/February 1984, pp. 34–37, the authors teach the systematical use of low-pass filters applied at block boundary. Low pass filtering is utilized also in U.S. Pat. No. 5,850,294 to Apostolopoulos et al. for blocking artifact reduction purposes. However, the blocks that potentially exhibit block artifacts are detected in the DCT domain and low-pass filtering is applied only for the distorted blocks. In B. Ramamurthi and A. Gersho, "Nonlinear Space-variant post processing of block coded images", IEEE Transactions on Acoustics, Speech and Signal Processing, vol. ASSP-34, October 1986, pp. 1258–1268, the proposed adaptive filtering is based on the detection of edge orientation at each block boundary pixel. Many authors, as in, for instance, A. Zakhor, "Iterative Procedure for Reduction of Blocking Effects in Transform Image Coding", IEEE Transactions on Circuits and Systems for Video Technology, vol. 2, No. 1, March 1992, pp. 91–95, have proposed various multi-pass procedure techniques for this purpose. The iterative techniques can provide potentially a higher performance than the non-iterative ones, but are less attractive for real time processing.

For mosquito noise artifact reduction (MNR), in U.S. Pat. No. 5,610,729, Nakajima teaches an estimation of block mean noise using the quantization step and the I, P, B coding mode when these data are available from the compressed bit stream. Nakajima teaches also the use of the well-known Minimum Mean Square Error (MMSE) filter proposed originally by J. S. Lee in "Digital image enhancement and noise filtering by use of local statistics", IEEE Transactions on PAMI-2, March 1980, pp. 165–168, for artifact reduction. However, in many applications, the quantization step or the coding mode is not necessary known or accessible. Moreover, while the MMSE filter is efficient for edge reservation, it is not necessary for noise reduction near an edge.

In U.S. Pat. No. 5,754,699, Sugahara proposes a similar approach by using block quantization step size information for noise power estimation and an empiric coring technique for artifact filtering.

Also for MNR, in U.S. Pat. No. 5,850,294, Apostolopoulos et al. propose a filtering on the true non-edge pixels within blocks containing edge pixels rather than smoothing the edge pixels, to avoid eventual blur and picture sharpness loss due to true edge filtering. However, the filtering technique for non-edge pixels is not clearly specified.

In a same manner, in U.S. Pat. No. 5,852,475, Gupta et al. apply separable low pass filters only on portions of an image that are not part of an edge and are not part of areas of texture or fine detail. The proposed post processor contains also a look up table based temporal digital noise reduction unit for reliable edge detection. For the chrominance signals Gupta et al. teach the use of simple low pass filtering. U.S. Pat. No. 5,920,356 to Smita et al. is an ameliorated version of U.S. Pat. No. 5,852,475 in which the filtering is controlled by a coding parameter of the replenished macro-blocks.

In U.S. Pat. No. 6,064,776 to Kikuchi et al., in a similar manner, a given block is classified according to whether it is considered part of a flat domain or not. If a block is considered as part of a flat domain, block pixel correction is then given by an AC component prediction technique.

In U.S. Pat. No. 6,188,799, Tan et al. teach the use of separable low-pass filtering, when block boundaries are located, for a serial reduction of blocking effect and then, mosquito noise. For detected blocking effect, the pixels are firstly corrected by a proposed modified version of bilinear interpolation and secondly, by a mean value of homogenous neighboring pixels within the quantization step size.

SUMMARY OF THE INVENTION

The present invention provides an apparatus and method for efficiently reducing noise in a block-based decoded image signal.

According to an aspect of the present invention, there is provided an apparatus for reducing noise in a block-based decoded image signal including a luminance component. The apparatus comprises an image region classifier responsive to said luminance component for analyzing each luminance pixel value of the luminance component according to a corresponding luminance pixel spatial context in a same frame of said image signal to classify the luminance pixel in a selected one of a plurality of predetermined image region classes associated with distinct image region spatial characteristics and to generate a corresponding selected region class indicative signal. The apparatus further comprises a shape-adaptive luminance noise power estimator responsive to said luminance component and said selected region class indicative signal for estimating statistical characteristics of said luminance pixel by using local window segmentation data associated with the luminance pixel, to generate a corresponding luminance noise power statistical characteristics indicative signal; and a shape-adaptive luminance noise reducer for filtering said luminance component according to said luminance noise power statistical characteristics indicative signal. Conveniently, the distinct image region spatial characteristics include edge, near edge, flat, near flat and texture spatial characteristics. Preferably, the block-based decoded image signal further includes first and second chrominance components, and the apparatus further comprises a shape-adaptive chrominance noise power estimator responsive to said chrominance components and said selected region class indicative signal for estimating statistical characteristics of first and second chrominance pixels associated with said luminance pixel by using local window segmentation data associated with each said chrominance pixel to generate a corresponding chrominance noise power statistical characteristics indicative signal; and a shape-adaptive chrominance noise reducer for filtering each said chrominance component according to said corresponding chrominance noise power statistical characteristics indicative signal.

According to a further aspect of the present invention, there is provided a method for reducing noise in a block-based decoded image signal including a luminance component. The method comprises the steps of: i) analyzing each luminance pixel value of said luminance component according to a corresponding luminance pixel spatial context in a same frame of said image signal to classify the luminance pixel in a selected one of a plurality of predetermined image region classes associated with distinct image region spatial characteristics and to generate a corresponding selected region class indicative signal; ii) estimating, from said luminance component and said selected region class indicative signal, statistical characteristics of said luminance pixel by using shape-adaptive local window segmentation data associated with the luminance pixel, to generate a corresponding luminance noise power statistical characteristics indicative signal; and iii) filtering said luminance component according to said luminance noise power statistical characteristics indicative signal. Conveniently, the distinct image region spatial characteristics include edge, near edge, flat, near flat and texture spatial characteristics. Preferably, the block-based decoded image signal further includes first and second chrominance components and, method further comprises the steps of: iv) estimating, from said chrominance components and said selected region class indicative signal, statistical characteristics of first and second chrominance pixels associated with said luminance pixel by using shape-adaptive local window segmentation data associated with each said chrominance pixel to generate a corresponding chrominance noise power statistical characteristics indicative signal; and v) filtering each said chrominance components according to said corresponding chrominance noise power statistical characteristics indicative signal.

According to a further aspect of the present invention, there is provided an apparatus and method for post-processing a decompressed image signal to reduce spatial mosquito noise therein. In particular, the post processor calls for an image multiple region segmentation, region noise power estimations for respectively luminance and chrominance signal components, and their associated adaptive noise corrections.

In segmenting an image into regions, the inventive apparatus and method employ edge/no-edge detectors and simple binary consolidation operators to classify and reinforce detected Edge (E), Near-Edge regions (NE), Flat regions (F), Near-flat regions (NF) and finally Texture (T) regions. The preferred segmentation is based essentially on the following observations: First, almost strong mosquito noise is found not only in NE regions but also in NF regions; second, some important noise is also noticeable in picture edges; third, texture masks mosquito noise; and fourth, any excessive filtering in texture or flat regions will degrade eventually fine signal details.

In estimating local noise power of the luminance component of the image signal, the inventive apparatus and method consider the diagonal high frequency component of the decoded image. The local noise power estimator comprises a local variance calculator that considers only local similar pixels to the current one, a look up table (LUT) for a conversion from observed diagonal high frequency component power to equivalent additive noise power. The noise power estimator also comprises a noise power weighting for each classified region and finally a low-pass filter for smoothing the variation of estimated local noise power between regions. Thus, the proposed method permits different smoothing degree for each segmented region and region transition to ensure resulting image quality.

For noise correcting, the proposed apparatus and method are based on a shape adaptive local segmented window that considers only the similar intensity pixels to the current one for the local mean and local standard deviation estimations. For reliable window segmentation, a diamond shape two-dimensional (2D) low pass filter is preferably required for the local adaptive windowing. The noise corrector further comprises a gain calculator in order to minimize the Mean Square Error (MMSE) for given local signal mean, local signal power and local additive noise power. The combination of local shape adaptive windowing and MMSE constitutes a noise corrector working on all of the above-cited classified regions.

It is worthwhile to mention that the proposed mosquito noise filtering also partly reduces the blocking effect.

From another broad aspect of the present invention, there is also provided an adaptive apparatus and method for noise power estimation and noise correction for the chrominance components which are severely damaged at low bit rate in a decoded video signal. In estimating local noise power in each chrominance component, the proposed method is similar to luminance component processing. However, in the chrominance case, the region classification is not required. In other words, there is only a single region for the whole image. For noise correcting of the chrominance component, the above luminance-based shape adaptive windowing and the MMSE technique are both utilized in a similar manner to the luminance case. Of course, considering the chrominance-sampling rate requires the use of suitable interpolation and decimation techniques for the chrominance signals.

BRIEF DESCRIPTION OF THE DRAWINGS

Embodiments of the present invention will be now described with reference to the accompanying drawings, in which.

DETAILED DESCRIPTION

Figure 1:
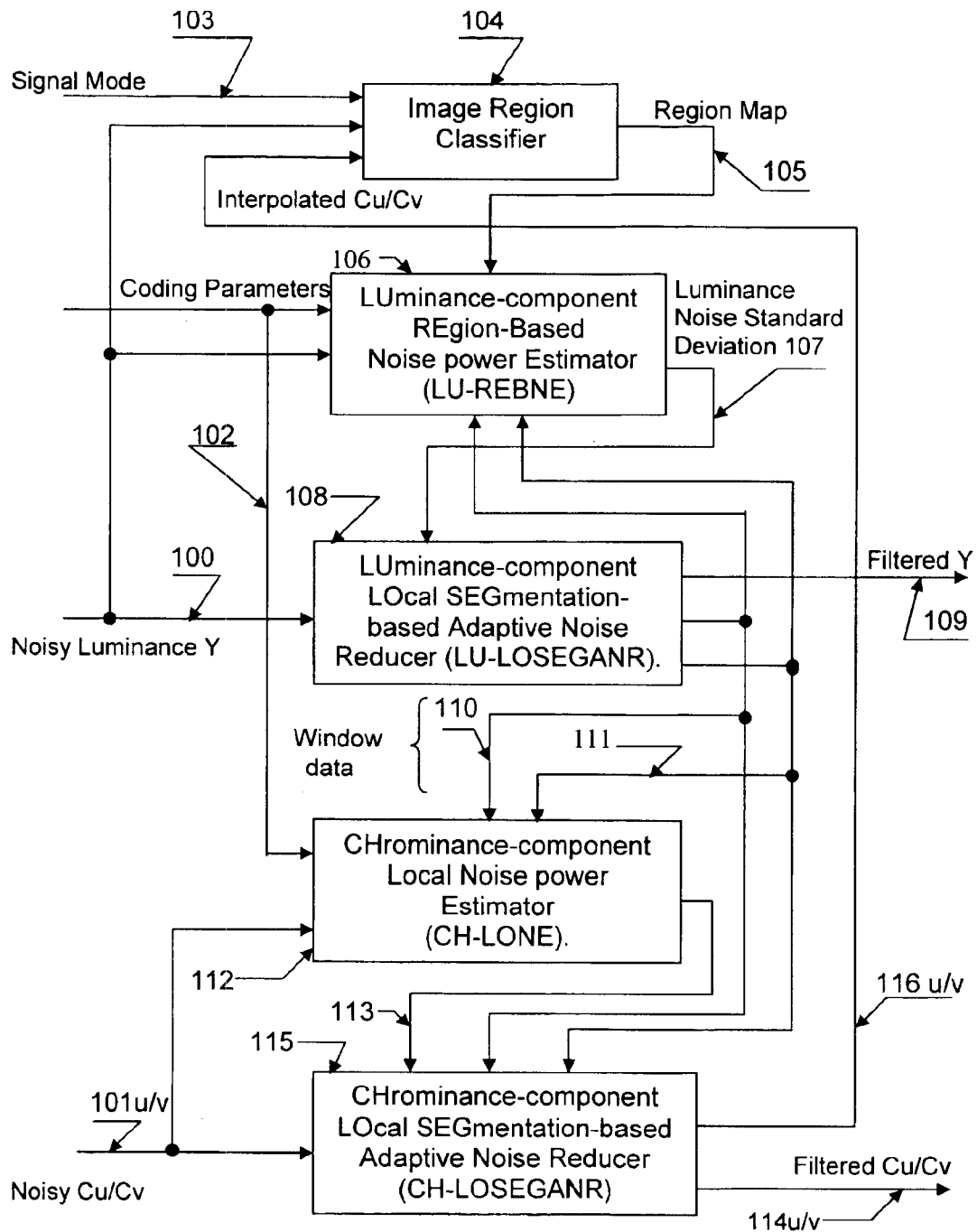
FIG. 1 is a general block diagram of a preferred embodiment of a mosquito noise reducing apparatus in accordance with the invention.

Referring now to the drawings, FIG. 1 represents a block diagram of an embodiment of a mosquito noise reduction apparatus 50 in accordance with the invention.

MNR apparatus 50 receives four (4) main system inputs. Image signal luminance Y and chrominance Cu/Cv components are applied at inputs 100 and 101u/v respectively. Coding Parameters at input 102 might represent, for example, an average coding bit rate. In the preferred implementation, this input is simply controlled by an end-user in a heuristic manner. Also, the end-user controlled Signal Mode signal 103 represents the thresholding values pre-determined for an image signal type such as DVD, DSS, DV-25 signal etc.

MNR apparatus 50 comprises five (5) main blocks: image Region Classifier (RC) 104, LUminance component REgion-Based Noise Power Estimator (LU-REBNE) 106, LUminance component LOcal SEgmentation-based Adaptive Noise Reducer (LU-LOSEGANR) 108, CHrominance component Local Noise power Estimator (CH-LONE) 112 and CHrominance component LOcal SEGgmentation-based Adaptive Noise Reduction (CH-LOSEGANR) 115. It is important to note that, for simplicity, FIG. 1 illustrates only one CH-LONE 112 and its associative CH-LOSEGANR 115 for both chrominance components Cu and Cv. Persons of ordinary skill in the art will understand that such components may be implemented in a time sharing manner or in parallel as is well known in the art.

Image Region Classifier (RC) 104 described in detail below with reference to FIG. 2 receives three (3) signals, namely: the decoded luminance Y 100, an interpolated chrominance Cu/Cv 116u/v and the signal mode 103 to generate a region map 105. Image Region Classifier 104 is responsive to the luminance component Y 100 of the decoded image signal for analyzing each luminance pixel value thereof in accordance with a corresponding luminance pixel spatial context in a same frame of said image signal. RC 104 classifies the luminance pixel in a selected one of a plurality of predetermined image region classes associated with distinct image region spatial characteristics and generates a corresponding selected region class indicative signal (Region Map 105). Conveniently, the predetermined image region classes or region map allows the classification of a current pixel as belonging to an edge (E), a flat region (F), a near flat region (NF), a near edge region (NE) or a finally textured (T) region, as distinct image region spatial characteristics.

Region map signal 105, luminance signal Y 100 and Coding Parameters 102 are applied as main inputs to the Luminance component REgion-Based Noise power Estimator (LU-REBNE) 106. Two (2) secondary signals 110 and 111 that represent data on the segmented local window generated by the LU-LOSEGANR 108 are also applied to LU-REBNE 106. LU-REBNE is a shape-adaptive luminance noise power estimator that is responsive to the luminance component Y 100 and the selected region class indicative signal (Region Map 105) for estimating statistical characteristics of the luminance pixel by using local window segmentation data associated with the luminance pixel, to generate a corresponding luminance noise power statistical characteristics indicative signal.

LU-REBNE 106 described further below with reference to FIG. 3 yields an estimated luminance noise local standard deviation signal 107 in the decoded luminance component. The noise local standard deviation is required further for a MMSE noise reduction.

Noise local standard deviation signal 107 and noisy luminance component Y 100 input to LU-LOSEGANR 108 which yields, in turn, a filtered Y luminance signal 109 and the two signals 110 and 111 containing data on the segmented local window characteristics. LU-LOSEGANR is a shape-adaptive luminance noise reducer for filtering the luminance component Y 100 according to the luminance noise power statistical characteristics indicative signal (noise local standard deviation signal 107). LU-LOSEGANR 108 is described further below with reference to FIG. 4.

Chrominance Cu/Cv signals 101u/v, Coding Parameters signal 102 and the segmented local window data signals 110 and 111 are applied to CHrominance component LOcal Noise power Estimator (CH-LONE) 112. CH-LONE 112 provides an estimated chrominance noise local standard deviation signal 113 in the chrominance component, required for a chrominance MMSE noise reduction as is described further below with reference to FIG. 5.

Finally, chrominance noise local standard deviation signal 113 and noisy chrominance Cu/Cv signals 101u/v are input to CH-LOSEGANR 115. CH-LOSEGANR 115 yields, in turn, interpolated chrominance components signals 116u/v optionally required in the RC block 104, and filtered Cu/Cv chrominance signals 114u/v. CH-LOSEGANR 115 is described further below with reference to FIG. 6.

As is understood by persons of ordinary skill in the art, appropriate delays for signal synchronization required by the various operations of MNR apparatus 50 are not illustrated. Implementation of such delays is well known in the art.

Figure 2:
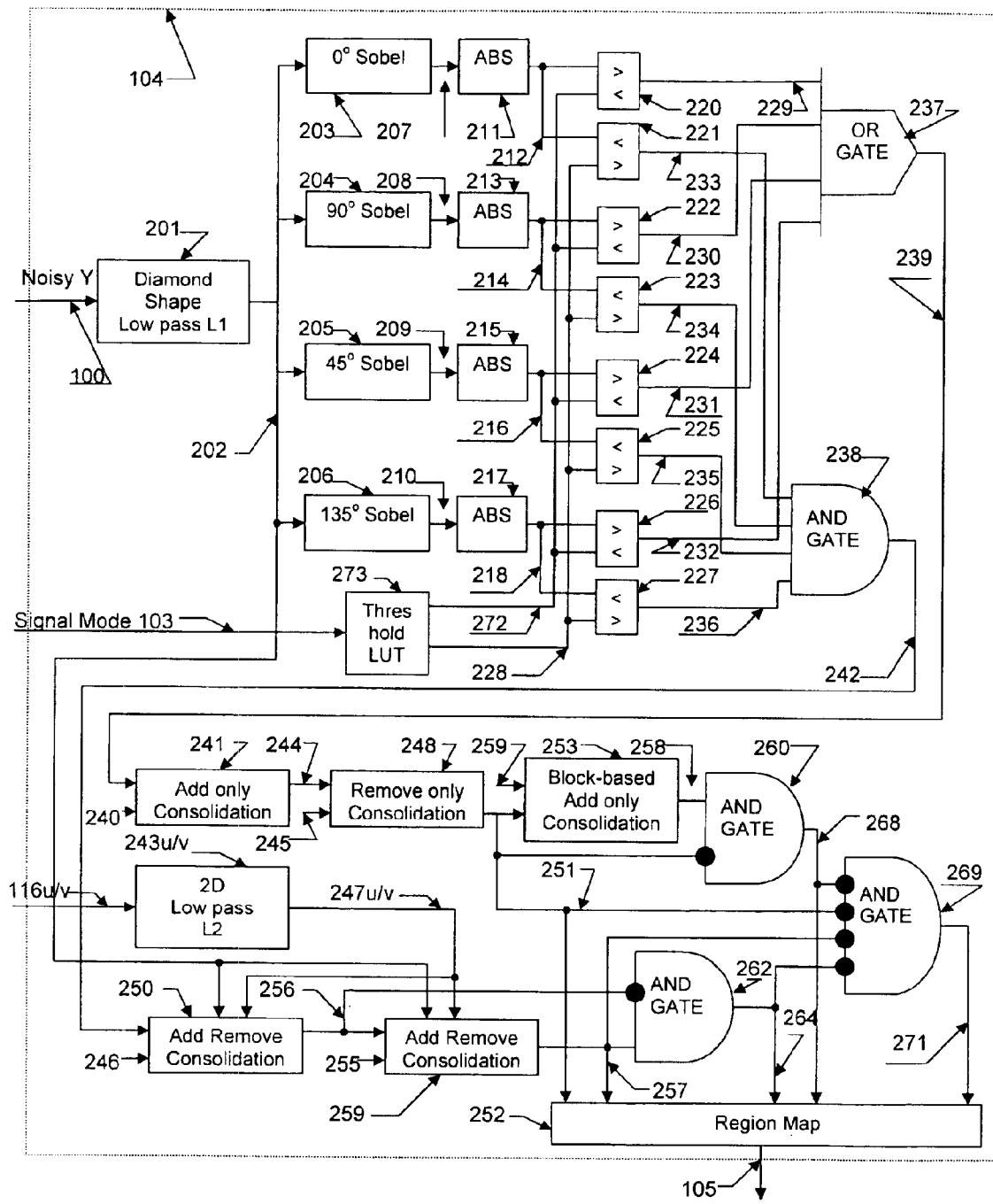
FIG. 2 is a block diagram of a Region Classifier (RC) included in the embodiment of FIG. 1.

Referring now to FIG. 2, there is illustrated in block diagram Region. Classifier (RC) 104 in accordance with the invention.

A decoded noisy luminance signal Y 100 is applied to the region classifier RC generally designated by 104. Firstly, for a reliable classification, the noisy signal Y is filtered by a diamond shape 2D diagonal low pass filter L1 (201) in order to reduce high frequency noise component. The filter impulse response is given by the following equation:

$$L_1(i,j) = \begin{bmatrix} 0 & 1 & 0 \\ 1 & 4 & 1 \\ 0 & 1 & 0 \end{bmatrix} / 8 \tag{1}$$

in which the couple (i, j) represents the current coordinates (line, column) of the central and considered pixel. The filter output 202 is sent to four (4) Sobel edge masks 203, 204, 205 and 206 designated respectively for 0°, 90°, 45° and 135°. Their respective impulse responses are:

$$Sobel_0(i, j) = \begin{bmatrix} 1 & 0 & -1 \\ 2 & 0 & -2 \\ 1 & 0 & -1 \end{bmatrix} \quad (2a)$$

$$Sobel_{90}(i, j) = \begin{bmatrix} 1 & 2 & 1 \\ 0 & 0 & 0 \\ -1 & -2 & -1 \end{bmatrix} \quad (2b)$$

$$Sobel_{45}(i, j) = \begin{bmatrix} 0 & -1 & -2 \\ 1 & 0 & -1 \\ 2 & 1 & 0 \end{bmatrix} \quad (2c)$$

$$Sobel_{135}(i, j) = \begin{bmatrix} 2 & 1 & 0 \\ 1 & 0 & -1 \\ 0 & -1 & -2 \end{bmatrix}. \quad (2d)$$

Each of the Sobel masks 203, 204, 205, and 206 has a respective output, 207, 208, 209 and 210, to a respective absolute value detector 211, 213, 215 and 217. The respective outputs 212, 214, 216 and 218 of the detectors 211, 213, 215 and 217 are now utilized for two different purposes: strong edge detection and flat region detection.

For edge detection, the four (4) absolute value detector outputs 212, 214, 216 and 218 are applied respectively to their associated thresholding (comparison) operators 220, 222, 224 and 226. The thresholding output is equal to 1 if its corresponding input is greater than or equal to a threshold value; otherwise, it will be 0. The pre-determined threshold values at 272 are given by a Look-Up Table (LUT) 273 that is controlled in turn by Signal Mode signal 103. The four comparison operator outputs 229, 230, 231 and 232 are applied together to an OR gate 237 whose output 239 represents a preliminary detection for strong edges in a given image. This detection is far from perfect; the detected edge can be broken or composed of isolated points. To partly remedy the situation, the preliminary detection binary signal 239 is submitted to two (2) non-linear operations in cascade. The first one, Add Only Consolidation (AOC) 241, is defined as follows: Consider a local window centered on the current pixel. If a count of the "1" number in the window is greater than or equal to a threshold, then the operator output is "1"; otherwise, the output remains unchanged. In the preferred implementation, the window dimension is 3×3 and the threshold value, at 240, is set to be 4. The AOC operator can be described by the following:

Let in(i, j) and out(i, j) denote respectively the input and the output of the operator at the coordinates (i, j) of the current pixel. Let W is the local window domain. The operator output is given by:

$$out(i, j) = \begin{cases} 1, & \text{if } \sum_{(n,m) \in W} in(i-n, j-m) \geq Threshold \\ in(i, j), & \text{otherwise.} \end{cases} \quad (3)$$

The second operator 248, Remove Only Consolidation ROC, is in turn given by:

$$out(i, j) = \begin{cases} 0, & \text{if } \sum_{(n,m) \in W} in(i-n, j-m) \leq Threshold \\ in(i, j), & \text{otherwise.} \end{cases} \quad (4)$$

In the above equation, in(i, j) and out(i, j) are respectively again the input and the output of the considered operator and W is the local window domain. In other words, if the count of "1" numbers in the window is smaller than or equal to a threshold, then the operator output is "0"; otherwise, the output remains unchanged. In the preferred embodiment, the window dimension is 3×3 and the ROC threshold at 245 is equal to 2. The ROC output signal 251 represents now the detected edge map.

In order to determine a Near Edge (NE) region, the detected edge map signal 251 is block-based expanded by a binary operator Block-based Add Only Consolidation (BAOC) 253. In the preferred embodiment, the block dimensions are 4 lines by 8 columns. There are a few reasons for these chosen dimensions: first, in some CODECs for recording mediums such as DV-25, DV-50, the block dimension can be 4×8 and in the popular MPEG-2, the compression blocks can be frame-based 8×8 (i.e. in a given field, the dimension of a block is 4×8); second, 4×8, which is a sub-block of 8×8, has been experimentally proved to be a compromise between over-correction and picture naturalness preservation. BAOC 253 is described as follows. In a given block, if the number of edge pixels, represented by a number of "1", is greater than or equal to a threshold, (e.g. 3) at 259, then all pixels in the block become "1"; otherwise, the block remains unchanged. Let B be the considered block domain. The descriptive equation is given by the following Equation (5):

$$\forall (i, j) \in B, out(i, j) = \begin{cases} 1, & \text{if } \sum_{(i,j) \in B} in(i, j) \geq Threshold \\ in(i, j), & \text{otherwise.} \end{cases} \quad (5)$$

BAOC output 258 is then applied to an AND gate 260 together with the negation of binary edge signal 251. Black dots at AND gate inputs denote negation of the considered input in FIG. 2. AND gate output 268 from AND gate 260 represents the detected NE region map signal.

For a flat region detection, the four (4) absolute value detector outputs 212, 214, 216 and 218 are applied respectively to four (4) other associated thresholding (comparison) operators 221, 223, 225 and 227. The thresholding output is equal to 1 if its corresponding input is smaller than a threshold value; otherwise, it will be 0. The pre-determined threshold values at 228 are given also by LUT 273 that is controlled in turn by Signal Mode signal 103. The four comparison operator outputs 233, 234, 235 and 236 are applied to an AND gate 238 whose output 242 represents a preliminary detection for flat regions in a given image. This flat region detection can be composed again of isolated points or isolated holes. To partly remedy the situation, preliminary detection binary signal 242 is submitted to two Add and Remove Conditional Consolidation (ARCC) operators 250 and 259 in series. A complete ARCC operator is given by the following equation:

$$out(i, j) = \begin{cases} 1, & \text{if } \sum_{(m,n) \in W} in(i-m, j-n) \geq Threshold1 \\ & \text{and } \forall (m, n) \in W, |YF(i-m, j-n) - YF(i, j)| < Threshold2 \\ & \text{and } \forall (m, n) \in W, |CuF(i-m, j-n) - CuF(i, j)| < Threshold2 \\ & \text{and } \forall (m, n) \in W, |CvF(i-m, j-n) - CvF(i, j)| < Threshold2 \\ 0, & \text{otherwise.} \end{cases} \quad (6)$$

In this equation, signal YF 202 denotes the filtered version of the noisy luminance input 100. Similarly, CuF and CvF at 247u/v correspond to the filtered version of the interpolated chrominance component inputs Cu and Cv 116u/v as provided by CH-LOSEGANR 115. The filtering is provided by the 2D low pass filters 243u/v. Moreover, in the preferred embodiment, for the first ARCC operator 250, the window dimension is 5×5, threshold1 at 246 is set to 16 and the internal threshold2 is set to 8. For the second ARCC operator 259, the window dimension is 21×21 as empirically chosen for typical video ITU-601 signal, the threshold1 at 255 is set to 3 and the internal threshold2 to 8. The second operator output signal 257 represents the Flat (F) region map.

It is interesting to note that omitting the chrominance components in Equation (6) yields a possible simplified, but less efficient version for Flat region consolidation.

The Flat region map signal 257 is applied together with the negation of the first ARCC output 256 to an AND gate 262. The AND gate output 264 represents the corresponding Near-Flat (NF) regions in which mosquito noise is very noticeable for the human vision system (HVS).

The Texture (T) region in the present embodiment is computed as NOT all of the four (4)-detected regions: E, NE, F and NF. The Texture region map signal 271 can be obtained with a NOT-AND gate 269 with four appropriate corresponding signal inputs: 268, 251, 257 and 262.

Finally, combining together the five above region maps by the classification block 252 yields the picture Region Map signal 105 utilized for noise power weighting. In order to avoid the potential conflict when a given pixel is classified to more than one region, classification is based on the following priority: Edge, Near Edge, Near Flat, Flat and Texture.

Figure 3:
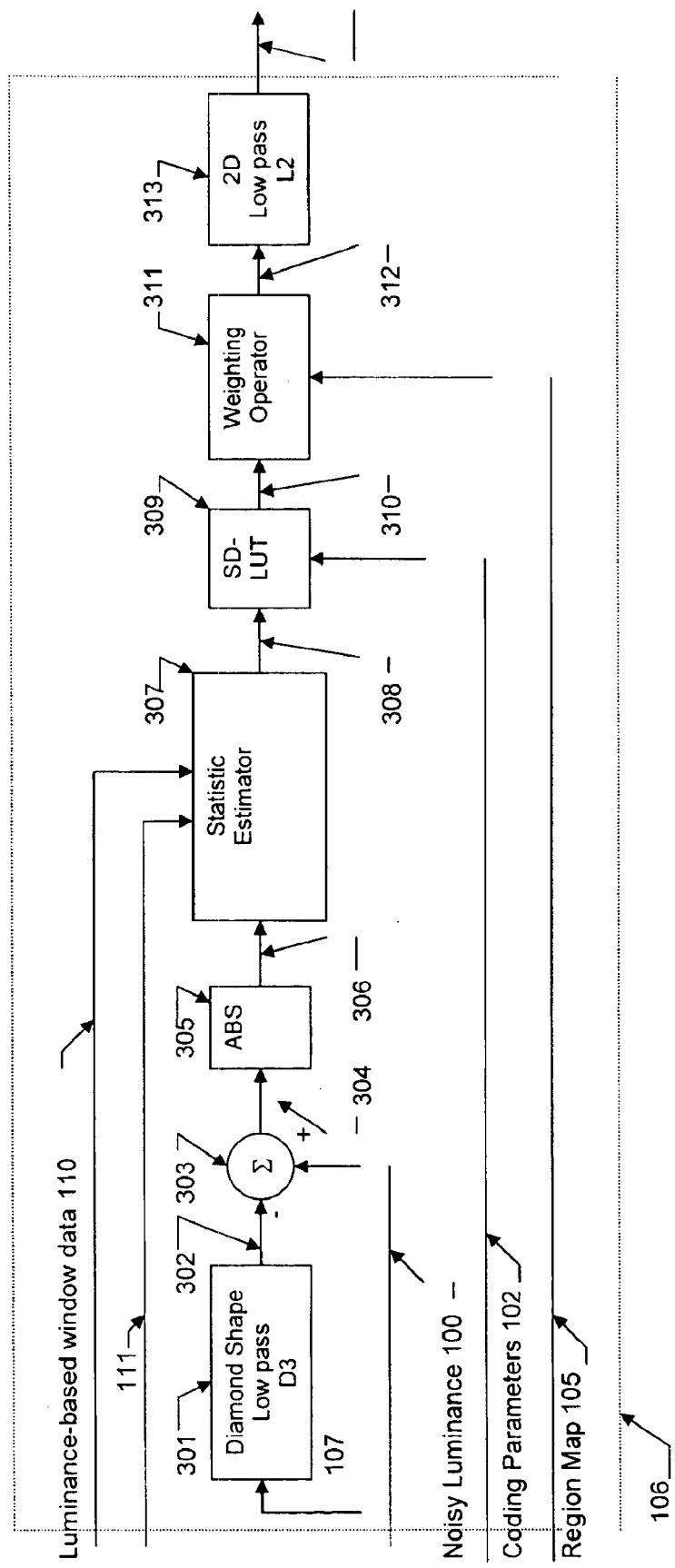
FIG. 3 is a block diagram of a LUminance component Region-Based Noise power Estimator (LU-REBNE) included in the embodiment of FIG. 1.

Referring now to FIG. 3, there is illustrated a block diagram for the LUminance component REgion-Based Noise power Estimation (LU-REBNE) generally designated at 106.

First of all, it can be frequently observed that there is no important signal component in a diagonal high frequency spatial domain. It is thus reasonable to use a diamond shape filter for noise power estimation. Let the noisy decoded luminance signal Y 100 be applied to the diamond shape high pass filter that is composed of a low pass filter 301 whose output 302 is connected to a subtractor 303. Subtractor 303 subtracts output 302 from luminance Y 100. The low pass filter 301 is given by the following impulse response:

$$d3(i, j) = \begin{bmatrix} 0 & 0 & 1 & 0 & 0 \\ 0 & 2 & 8 & 2 & 0 \\ 1 & 8 & 20 & 8 & 1 \\ 0 & 2 & 8 & 2 & 0 \\ 0 & 0 & 1 & 0 & 0 \end{bmatrix} / (64) \quad (7)$$

Figure 4:
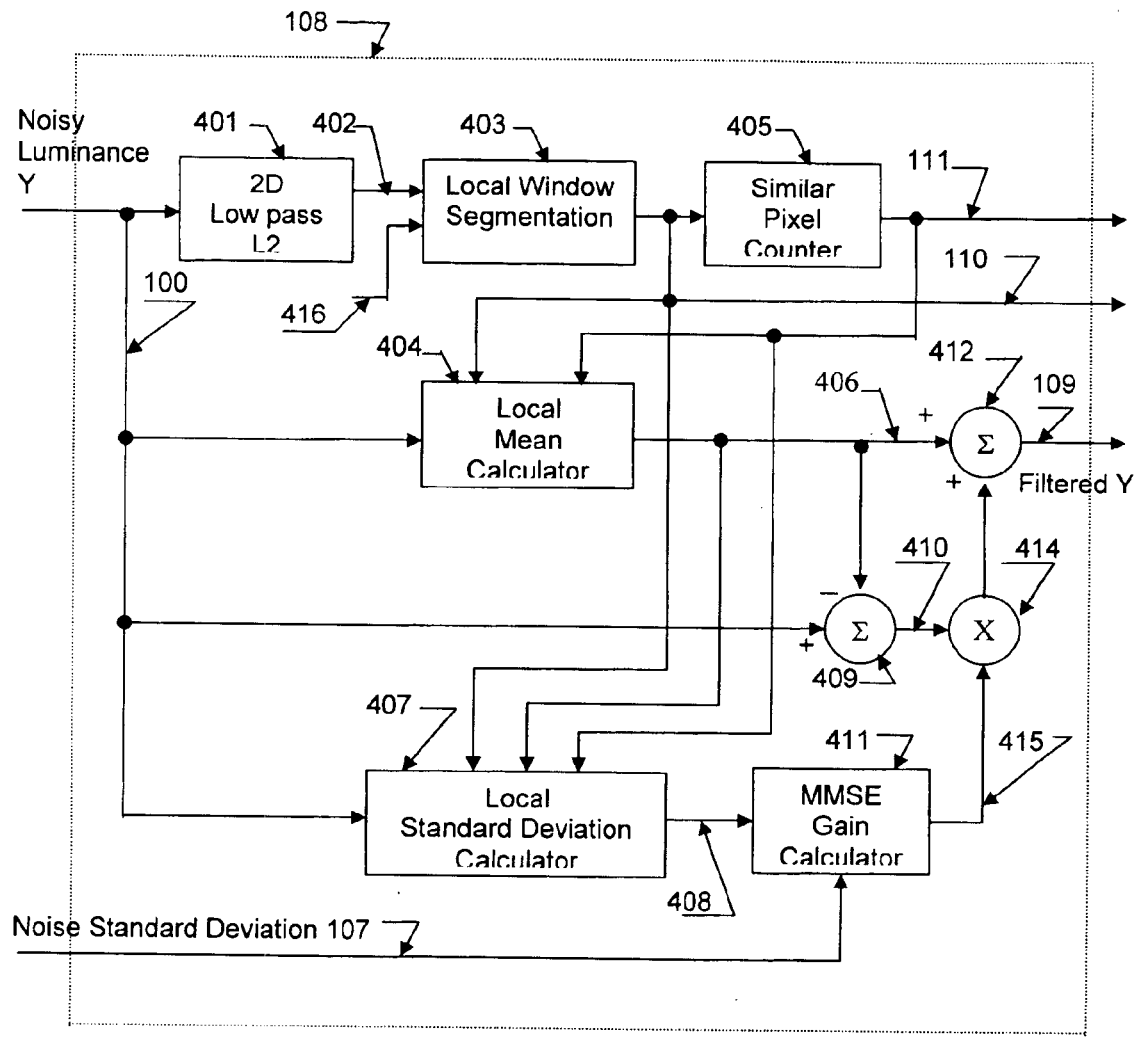
FIG. 4 is a block diagram of a LUminance component LOcal SEGmentation-based Adaptive Noise Reducer (LU-LOSEGANR) included in the embodiment of FIG. 1.

The high pass filter output 304 is applied to an absolute value detector 305 whose output is sent in turn to a statistic estimator 307, which is a shape-adaptive windowing local standard deviation (SD) estimator. The shape adaptive windowing, conceptually based on a homogenous region of similar pixels to the current one in a local window, is required for a reliable local SD estimation in a varying environment in a picture. The shape adaptive windowing segmentation data described further in detail with reference to FIG. 4, is composed of, at the input 110, a local binary window, $w(i-m, j-n) \in \{0,1\}$, for the current pixel of coordinates (i, j) and, at the input 111, the number N of "1" for similar pixels to the current pixel in the window. Clearly, N equals to:

$$N = \sum_{(i,j) \in W} w(i-m, j-n) \quad (8)$$

A standard deviation estimator, such as 307, can be generally based on the following equations:

$$\mu(i, j) = \left( \sum_{(m,n) \in W} w(i-m, j-n) g(i-m, j-n) \right) / N \quad (9)$$

and, $$\sigma(i, j) = \quad (10)$$
$$C \left( \sum_{(m,n) \in W} w(i-m, j-n) |g(i-m, j-n) - \mu(i, j)| \right) / N$$

In Equation (10), g(i, j), μ(i, j) and σ(i, j) are respectively the estimator input, the internal local mean and the estimated local SD output. Moreover, depending on the anticipated noise distribution the constant C can be chosen in accordance with equal to 1.25 appropriately for additive Gaussian noise, to 1.15 for additive uniform noise or, simply omitted. In the preferred embodiment, the window dimension is chosen as 5 lines×11 columns. For the high frequency signal, the local mean μ(i,j) can be set to zero in Equation (10).

The SD estimator 307 output, at 308, is provided to a look-up table SD-LUT 309 further controlled by Coding Parameters 102. The purpose of SD-LUT 309 is to convert the estimated local standard deviation at 308 to the standard deviation of an equivalent additive noise. SD-LUT 309 generation is previously described in U.S. patent application Ser. No. 09/603,364 (now U.S. Pat. No. 6,633,683 issued Oct. 14, 2003) by the present inventors and assigned to the same assignee, which application is incorporated herein by reference. In that application, a generic configuration and method for random and correlated noise reduction are described. SD-LUT 309 estimates at its output 310 a mean value of local noise input SD $\sigma_m(x, y)$ (or variance $\sigma_m^2(x, y)$). The LUT input-output relationship between the two local standard deviations or $\sigma_r(x, y)$ (or variance $\sigma_r^2(x, y)$) and $\sigma_m(x, y)$ (or variance $\sigma_m^2(x, y)$) can be described by the following method. Let consider the linear portion of the expression representing weight $K(x, y)$:

$$K(x, y) = (\sigma_g^2(x, y) - \sigma_n^2(x, y))/(\sigma_g^2(x, y)) \quad (11)$$

wherein the unknown additive noise variance $\sigma_n^2(x, y)$ is expected to be varying. It is thus necessary to pre-estimate this variance value for each pixel located at $(x, y)$.

Figure 7:
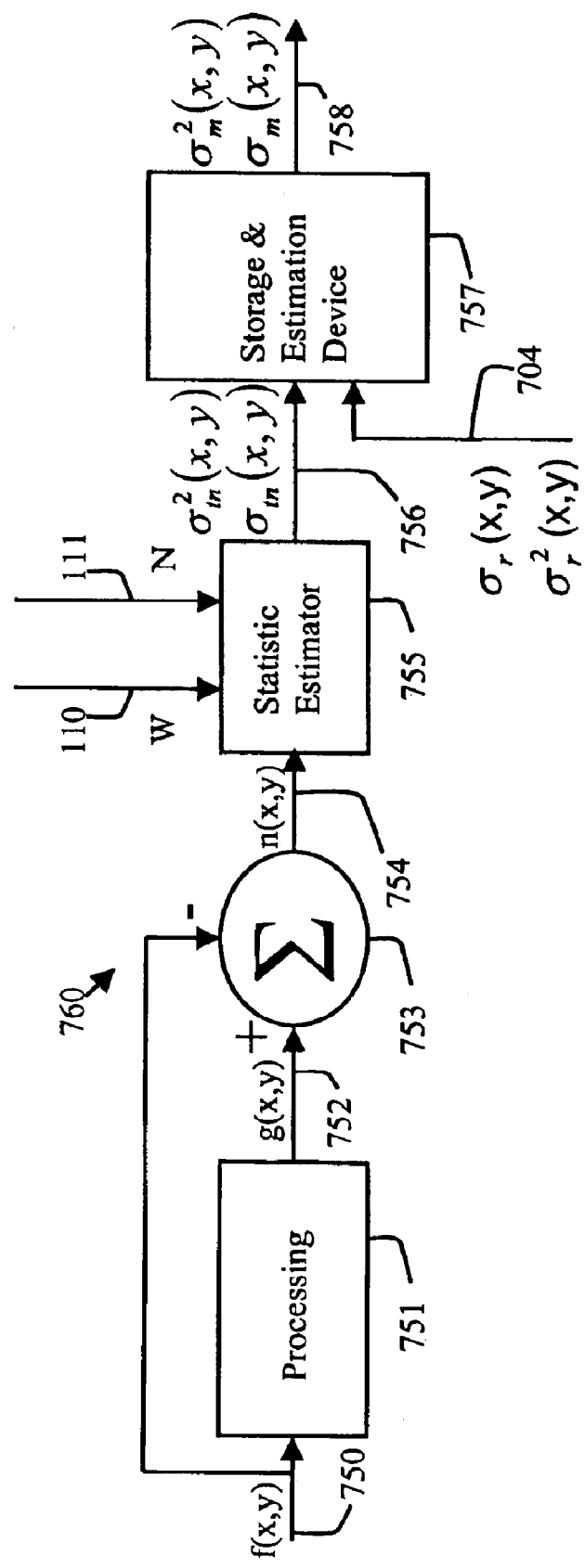
FIG. 7 is a block diagram of a proposed configuration used for performing an off-line noise variance pre-estimation.

Referring now to FIG. 7, in many situations where the processing is well defined, such as for NTSC or PAL encoding/decoding and DCT-based compression/decompression, an available original and clean test signal $f(x, y)$ can be used for noise evaluation. FIG. 7 illustrates partly a proposed configuration generally designated at 760 used for performing an off-line noise variance pre-estimation. The original test signal $f(x, y)$ at 750 is applied to the above-mentioned processing at 751 that gives a test noisy image signal $g(x, y)$ at 752. The additive test noise signal $n(x, y)$ at 754 is then obtained by the difference ($g(x, y) - f(x, y)$) provided by an adder 753 and is sent in turn to a statistic calculator 755 similar to the calculator 307 shown in FIG. 3. The test noise SD $\sigma_{in}(x, y)$ (or the test noise variance $\sigma_{in}^2(x, y)$) estimation is done in the same context as that of the luminance signal Y 100 in LU-LOSEGANR 108 shown in FIG. 4, with the segmented window parallel signals $w(l-m, j-n)$ at 110 and the selected-pixels count signal N at 111. That is, for a considered pixel at $(x, y)$, one may obtain a pair of SD values $(\sigma_r(x, y), \sigma_n(x, y))$ (or a pair of variance values $(\sigma_r^2(x, y), \sigma_n^2(x, y))$). For the whole test picture or set of test pictures, a given value of $\sigma_r$ (or $\sigma_r^2$) can have many resulting values of $\sigma_{in}$ (or $\sigma_{in}^2$). In order to obtain a unique input-output relationship for the SD-LUT 309, it is necessary, for a given $\sigma_r$ (or $\sigma_r^2$), to define a single value $\sigma_m$ representing all possible values of $\sigma_{in}$. For the preferred SD calculation, proposed estimations for $\sigma_{in}$ are as follows:

$$\sigma_m = \text{mean}(\sigma_{in}, \text{ given a value of } \sigma_r) \quad (12)$$

or $$\sigma_m = \text{mode}(\sigma_{in}, \text{ given a value of } \sigma_r) \quad (13)$$

Figure 8:
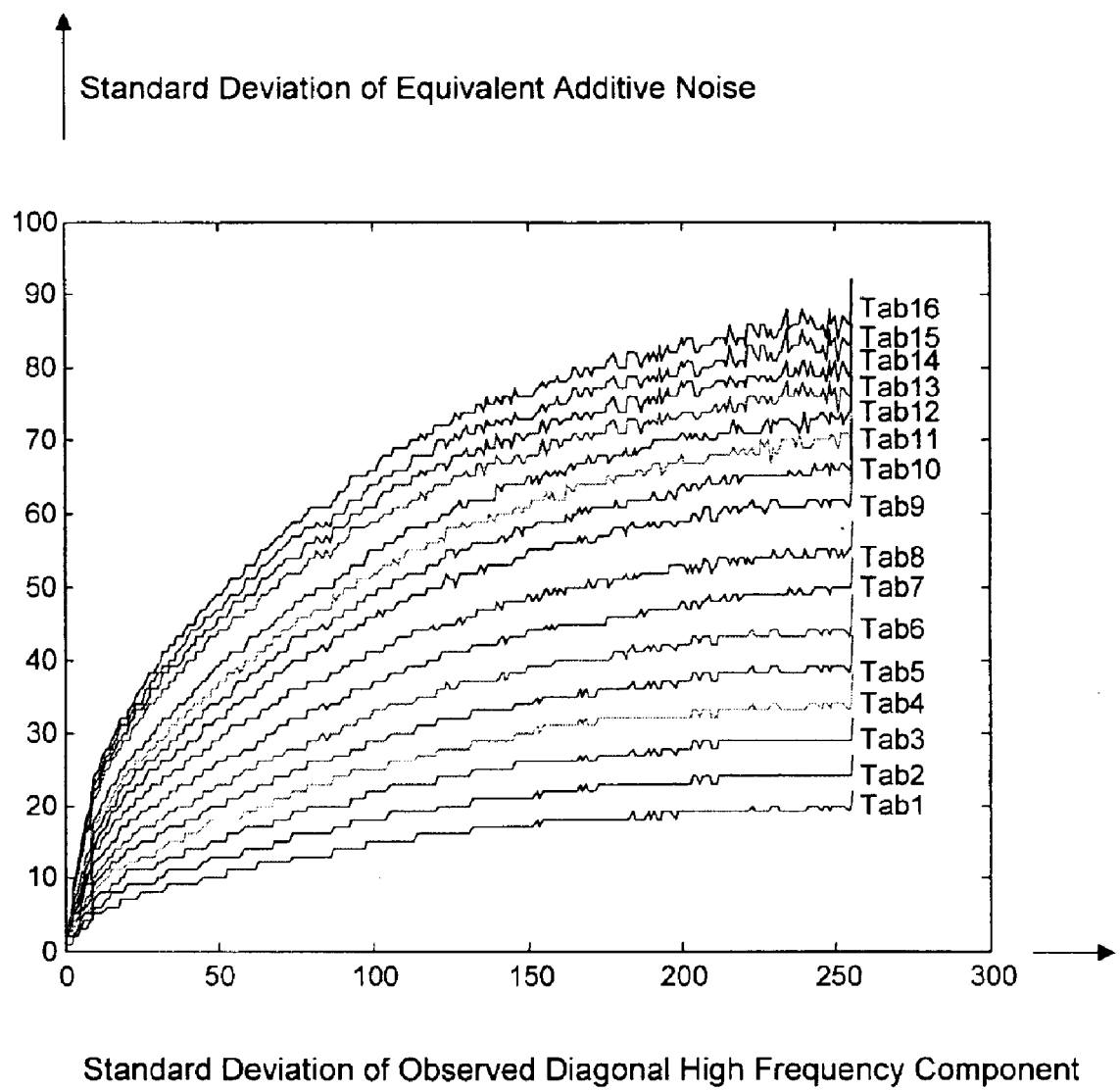
FIG. 8 illustrates an empirical form of a Look-Up Table (LUT) for a conversion of observed diagonal high frequency component power to equivalent additive noise power.

The estimation (12) or (13) can be done then on an off-line basis by a data storage and estimation device 757. The input-output result $(\sigma_r, \sigma_m)$ at 704 and 758 respectively, permits the establishment of a pre-calculated SD-LUT 309 for real time processing involving an unknown image. If the memory SD-LUT 309 is large enough, some controllable bits can be fed at parameters input 102 representing a learning or functional condition, for example for NTSC, PAL or 12 Mbit MPEG. The main requirement of the method is the prior knowledge of the processing to create the noisy image $g(x, y)$ from the clean image $f(x, y)$. In the present case, the SD-LUT 309 is empirically obtained with various test sequences coded by 16 usual bit rates corresponding to end-user controlled Coding Parameters 102. FIG. 8, in the preferred embodiment, represents typically the relationship between the observed SD and the noise coding SD for various Coding Parameters 102. The SD-LUT output 310, designated by $\sigma_m(i, j)$, is applied to the weighting function 311 for MMSE noise reduction explained further with reference to FIG. 4. Depending on the detected region at the current pixel location $(i, j)$ indicated by region map 105, the weighting function output signal 312, designated now by $\sigma_e(i, j)$, is empirically given by the following equation:

$$\sigma_e(i, j) = \begin{cases} (4/8) \cdot \sigma_q(i, j), & \text{for Edge Region} \\ (5/8) \cdot \sigma_q(i, j), & \text{for Near Edge Region} \\ (5/8) \cdot \sigma_q(i, j), & \text{for Near Flat Region} \\ (2/8) \cdot \sigma_q(i, j), & \text{for Flat Region} \\ (2/8) \cdot \sigma_q(i, j), & \text{for Texture Region} \end{cases} \quad (14)$$

It is worthwhile to note that, in the present embodiment, the noise contribution on Edge pixel is considered as important as the noise contribution on Near-Edge or Near-Flat regions. Such noise will be heavily filtered in these three regions. Inversely, the filtering in Texture region should be sufficiently light enough, since texture already masks noise. Finally, in Flat regions, noise is relatively small and nearly random; excessive filtering will degrade eventually fine but visible signal details.

In order to smooth the region transitions, the weighting function output signal 312 $\sigma_e(i,j)$ is applied to a 2D low pass filter L2 at 313, which is a separable filter. The 2D impulse response is:

$$L_2(i, j) = \begin{bmatrix} 1 & 2 & 1 \\ 2 & 4 & 2 \\ 1 & 2 & 1 \end{bmatrix} \Big/ (16) \quad (15)$$

The filter output signal $\sigma_n(i,j)$ at 107, considered as local SD of an equivalent additive but varying noise, is provided to the noise correcting block 108.

Referring now to FIG. 4, there is illustrated a block diagram of the LUminance component LOcal SEGmentation-based Adaptive Noise Reducer (LU-LOSEGANR) 108. There are many Spatial Adaptive Noise Reduction techniques known in the art. However, few of them are, firstly, robust in presence of noise and, secondly, efficient in the Edge Region(s) of a picture. LU-LOSEGANR 108 is a simplified version of the generic Adaptive Noise Reducer described in the above-cited U.S. patent application Ser. No. 09/603,364. In order to give some robustness to a local segmentation in the presence of noise, a simple low pass filter 401 described by Equation (15) is utilized for the noisy input signal 100. The filter output 402, denoted as $g^*(i,j)$ is applied to a local window segmentation 403. The later provides, in the considered window domain W, a set of binary signals $w(i-m, j-n)$ 110 defined as:

$$\text{For } (m, n) \in W, \; w(i-m, j-n) = \begin{cases} 1, & \text{if } |g^*(i-m, j-n) - g^*(i, j)| < \text{Threshold} \\ 0, & \text{otherwise.} \end{cases} \quad (16)$$

Thus, the binary signals w designate a homogenous region, within a threshold tolerance, to the current pixel located at $(i,j)$. The local window therefore becomes shape-adaptive. The threshold value is applied at 416 and is set, in the preferred embodiment, to 12. The number N, at 111, of "1" for similar pixels in the window, is provided by the counter 405.

In order to provide efficient estimation of the two first order signal statistics, the window binary signals 110 and its parameter N signal 111 are connected to a local mean calculator 404 and a local SD calculator 407 for the noisy input signal 100. The calculators are described respectively again by the above equations (9) and (10).

Finally, in order to provide efficient noise reduction in a varying environment of picture signal, such as edge regions, a MMSE coring technique is given by a gain calculator 411 operating on the two SD values, the first one σ(i,j) 408 coming from the noisy signal, the second one σ$_n$(i,j) 107 coming from noise power estimator illustrated in FIG. 3. The said MMSE coring K(i,j), at 415, is described by the following equation:

$$K(i, j) = \max\left[0, \frac{\sigma^2(i, j) - \sigma_n^2(i, j)}{\sigma^2(i, j)}\right] \quad (17)$$

A possible simplified version of Equation (17), at the expense of heavier signal reduction, is an MMSE-like coring defined as:

$$K(i, j) = \max\left[0, \frac{\sigma(i, j) - \sigma_n(i, j)}{\sigma(i, j)}\right]. \quad (18)$$

Finally, the filtered output luminance signal Y*(i,j) at 109 is given by $$Y^*(i,j) = \text{mean}[Y(i,j)] + K(i,j) \cdot \{[Y(i,j) - \text{mean}[Y(i,j)]]\} \quad (19)$$

using a first adder 409 having its output 410 feeding a multiplier 414 receiving K(i,j) at 415 and feeding in turn a second adder 412, as illustrated in FIG. 4.

Figure 5:
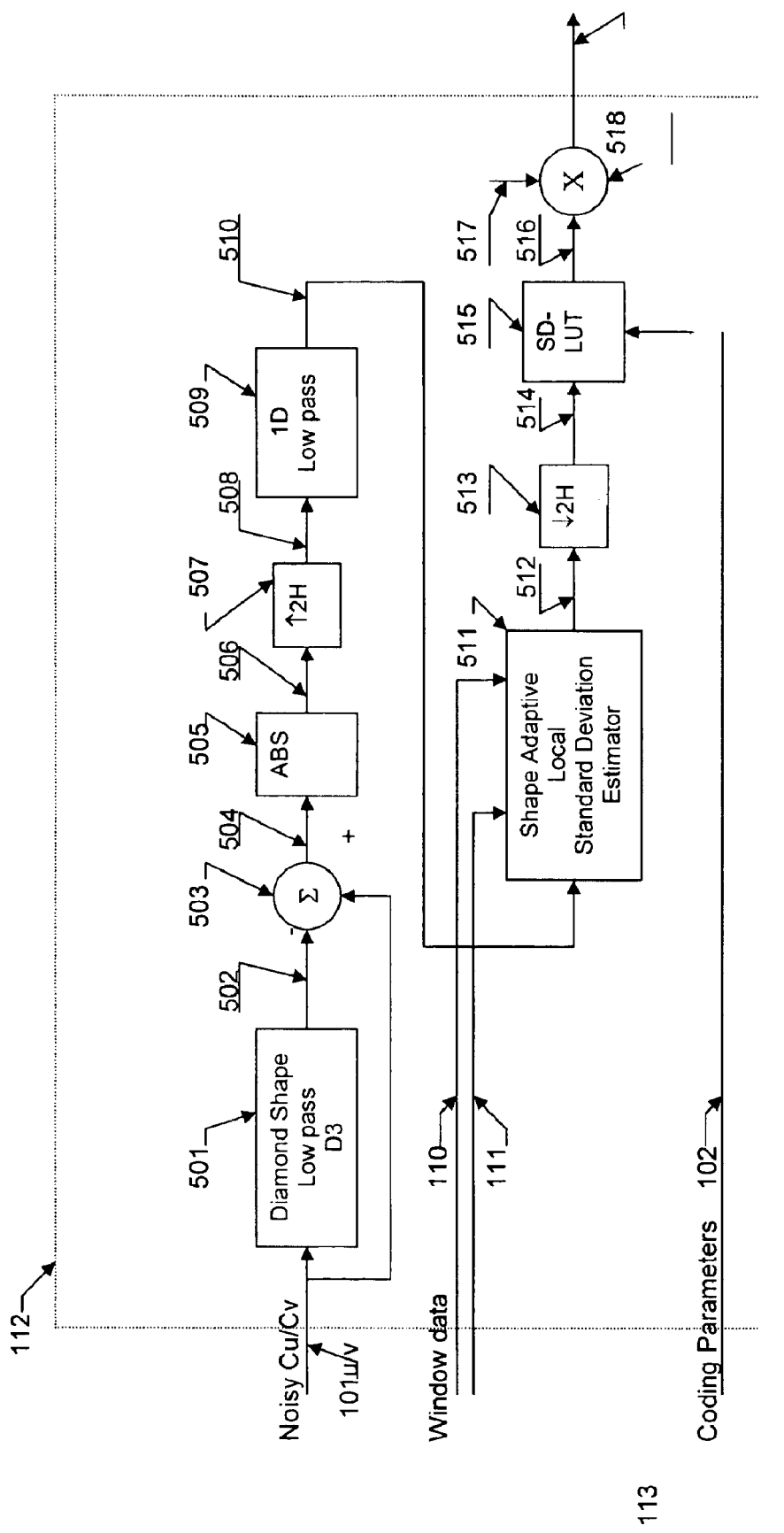
FIG. 5 is a block diagram of a CHrominance component LOcal Noise power Estimator (CH-LONE) included in the embodiment of FIG. 1.

Referring now to FIG. 5 that represents the CHrominance component LOcal Noise power Estimator (CH-LONE) block diagram 112 of FIG. 1. The CH-LONE principle is similar to the luminance case. For each chrominance component, as illustrated, CH-LONE 112 comprises a diamond shape low-pass filter 501 for high frequency component extraction with an output 502 connected to a subtractor 503. Subtractor 503 subtracts output 502 from Noisy Cu/Cv 101uv for output 504 to an absolute value detector 505. Local shape adaptive noise power estimator with a 2H up-sampler 507 receives output 506 from detector 505. 1D low-pass filter 509 receives output 508 and supplies its output 510 to a shape-adaptive local standard deviation estimator 511. Output 512 of estimator 511 is provided to a 2H down-sampler 513 and thereafter via output 514 to additive noise SD-LUT 515. SD-LUT output 516 is connected to multiplier 518 that applies a weighting factor 517. The proposed configuration is based on some assumptions: firstly, for simplicity purpose, the shape adaptive local windowing can be the same as in the luminance signal; secondly, for the use of the luminance-based window segmentation data, it has been experimentally found that good results can be obtained if the chrominance is interpolated to the luminance resolution via up-sampler 507 and low-pass filter 509 followed by down-sampler 513. (Conversely, decimating the luminance-based window segmentation data to the chrominance resolution does not yield a better solution); thirdly, it is not necessary to classify the chrominance image to multiple regions as in the luminance case; and finally, in the proposed apparatus and method and as found through experimentation, the weighting factor applied after the SD-LUT 515 by multiplier 518 is sufficiently set to equal to (½) at 517 in order to re-use the same luminance SD-LUT (309).

Figure 6:
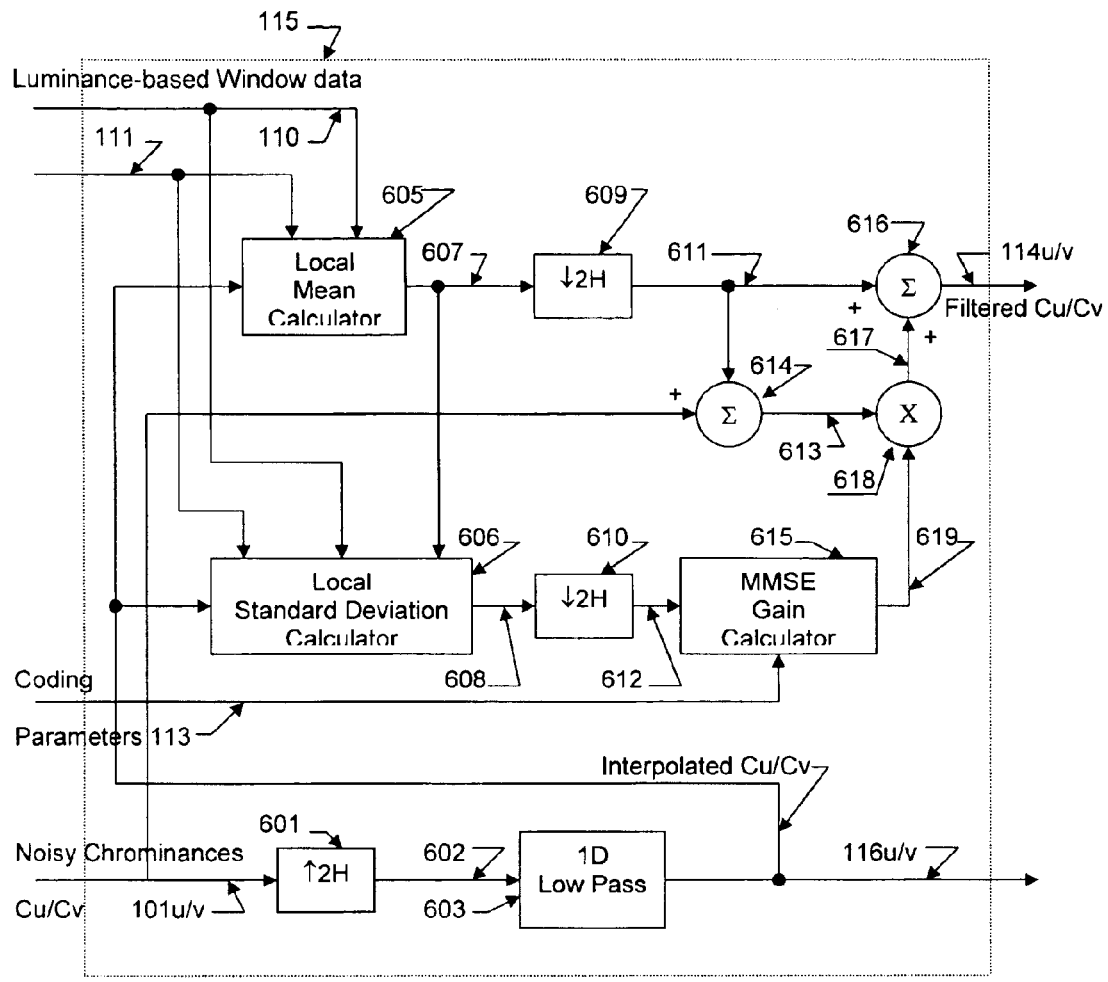
FIG. 6 is a block diagram of a CHrominance component LOcal SEGmentation-based Adaptive Noise Reducer (CH-LOSEGANR) included in the embodiment of FIG. 1.

Referring now to FIG. 6, there is represented a block diagram of the CHrominance component LOcal SEGmentation-based Adaptive Noise Reducer (CH-LOSEGANR) 115. Again, the noise reduction technique in each chrominance component is similar to the technique for luminance noise reduction illustrated in FIG. 4.

The main difference is the appropriate signal used for interpolation by up-sampler 601 and Interpolation filter 603 as required, firstly, for the estimation of the first two statistics using the luminance-based window segmentation data; and secondly, for the Flat region classification as described before with reference to FIG. 2. For a 4:2:2 video-sampling pattern, the illustrated by-two (2) up-sampler 601 is simply horizontal, the corresponding interpolator being a horizontal half-band filter. In the proposed system, the filter impulse response is given by the following coefficients: (−5, 0, 37, 64, 37, 0, −5)/(64). Of course, appropriate down-samplers 609 and 610 following, respectively, the local mean calculator 605 and the local standard deviation calculator 606 are necessary for respecting the original chrominance resolution. Since the local mean and the local standard deviation are slowly varying, no filter is required further for these down sampling operations. For a 4:2:0 or other sampling patterns, the up-sampler 601 and the interpolation filtering are more elaborate but well known to people of ordinary skill in the art.

Moreover, for chrominance video components, even theoretically zero-mean signals, a local mean calculator 605 is still utilized. Its presence can be justified since a local windowed signal mean is not necessary equal to zero. It is interesting to note again that, for noise correction, the luminance-based shape adaptive windowing, previously described, is generally sufficient for chrominance signals.

While the invention is described with reference to MNR apparatus 50, persons skilled in the art will readily understand that the methods described herein may be embodied in a computer readable medium containing executable instructions for enabling a programmable processor (e.g. complex programmable logic device (CPLD), filed programmable gate array (FPGA), micro processor, etc.) to perform the methods of the invention. Further, the invention herein may comprise a computer system including a processor programmed by such executable instructions.

What is claimed is:

1. An apparatus for reducing noise in a block-based decoded image signal including a luminance component, said apparatus comprising:

an image region classifier responsive to said luminance component for analyzing each luminance pixel value of the luminance component according to a corresponding luminance pixel spatial context in a same frame of said image signal to classify the luminance pixel to a selected one of a plurality of predetermined image region classes associated with distinct image region spatial characteristics and to generate a corresponding selected region class indicative signal;

a shape-adaptive luminance noise power estimator responsive to said luminance component and said selected region class indicative signal for estimating statistical characteristics of said luminance pixel by using local window segmentation data associated with the luminance pixel, to generate a corresponding luminance noise power statistical characteristics indicative signal; and a shape-adaptive luminance noise reducer for filtering said luminance component according to said luminance noise power statistical characteristics indicative signal.

2. The apparatus according to claim 1, wherein said distinct image region spatial characteristics includes edge, near edge, flat, near flat and texture spatial characteristics.

3. The apparatus as claimed in claim 2, wherein said image region classifier comprises:

a high frequency noise component reducer for receiving at least said luminance pixel value and providing a filtered luminance pixel value;

a plurality of edge value detectors each responsive to the filtered luminance pixel value for providing an absolute value signal indicative of the presence of a respective edge;

a strong edge detector responsive to each of the edge value detectors for providing a near edge (NE) signal if the absolute value signals are indicative of a distinct near edge image characteristic and providing an edge (E) signal if the absolute value signals are indicative of a distinct edge image characteristic;

a flat region detector responsive to each of the edge value detectors for providing a near flat (NF) signal if the absolute value signals are indicative of a distinct near flat image characteristic and providing a flat (F) signal if the absolute value signals are indicative of a distinct flat image characteristic; and a texture region generator responsive to the strong edge detector and the flat region detector for providing a texture signal.

4. The apparatus as claimed in claim 3 wherein said plurality of edge value detectors are designated respectively for edges at 0°, 90°, 45° and 135°.

5. The apparatus as claimed in claim 3, wherein said texture region generator comprises a NAND operator for receiving said near-flat signal, said flat signal, said near-edge signal, said edge signal and providing a texture signal.

6. The apparatus as claimed in claim 3 wherein said strong edge detector comprises a preliminary strong edge detection unit receiving the absolute value signal from each of the edge value detectors, the preliminary strong edge detection unit being followed by first and second pixel-based non-linear operation units and a block-based non-linear operation unit, the block-based non-linear operation unit providing the near-edge signal, the second pixel based non-linear operation unit providing the edge signal.

7. The apparatus as claimed in claim 6, wherein said first pixel-based non-linear operation unit is an add only consolidation unit receiving a signal from said preliminary strong edge detection unit and a predetermined threshold and having an output out(i,j) for a given input in(i,j) in accordance with:

$$\text{out}(i, j) = \begin{cases} 1 & \text{if } \sum_{(n,m) \in W} \text{in}(i-n, j-m) \geq \text{Threshold} \\ \text{in}(i, j) & \text{otherwise} \end{cases}$$

wherein W is a local window and Threshold is the predetermined threshold.

8. The apparatus as claimed in claim 6, wherein said second pixel-based non-linear operation unit is a remove only consolidation unit receiving a signal from said first pixel-based non-linear operation unit and a predetermined threshold, the remove only consolidation unit having an output out(i,j) for a given input in(i,j) in accordance with:

$$\text{out}(i, j) = \begin{cases} 0 & \text{if } \sum_{(n,m) \in W} \text{in}(i-n, j-m) \leq \text{Threshold} \\ \text{in}(i, j) & \text{otherwise} \end{cases}$$

wherein W is a local window and Threshold is the predetermined threshold.

9. The apparatus as claimed in claim 6, wherein said block-based non-linear operation unit receives a signal from the second pixel-based non-linear operation unit and a predetermined threshold signal and provides an output out (i,j) for an input in(i,j) in accordance with:

$$\forall (i, j) \in B, \text{out}(i, j) = \begin{cases} 1 & \text{if } \sum_{(i,j) \in B} \text{in}(i, j) \geq \text{Threshold} \\ \text{in}(i, j) & \text{otherwise} \end{cases}$$

wherein B is a predetermined block of pixels and Threshold is the predetermined threshold.

10. The apparatus as claimed in claim 9 wherein said said block-based non-linear operation unit further comprises an AND operator for receiving the logical negation of the input signal and the output signal of the block-based add only consolidation and providing the near-edge signal.

11. The apparatus as claimed in claim 3 wherein said flat region detector comprises a preliminary flat region detection unit for receiving the absolute value signals from the edge value detectors; first and second pixel-based non-linear operation units; and an AND operator; wherein the first pixel-based non-linear operation unit receives a signal from the preliminary flat region detection unit, the filtered luminance pixel value, a filtered chrominance component and two threshold values and provides an output signal; wherein the second pixel based non-linear operation unit receives the output signal from the first pixel-based non-linear operation unit, the filtered luminance pixel value, the filtered chrominance component and two threshold values and provides the flat signal; and wherein the AND operator receives the flat signal and the logical negation of the output signal of the first pixel based non-linear operation unit and provides the near-flat signal.

12. The apparatus as claimed in claim 1 wherein the shape-adaptive luminance noise power estimator comprises:

a shape-adaptive windowing local standard deviation estimator responsive to said luminance component for providing a local estimated standard deviation signal;

an additive noise statistical determiner responsive to the local estimated standard deviation signal for generating an additive noise statistical signal; and a weighting operator responsive to the additive noise statistical signal and region class indicative signal for determining the luminance noise power statistical characteristics indicative signal.

13. The apparatus as claimed in claim 12 wherein the additive noise statistical determiner is further responsive to a coding parameter signal for generating additive noise statistical signal.

14. The apparatus as claimed in claim 13 wherein the additive noise statistical determiner is a look-up table.

15. The apparatus as claimed in claim 12 further comprising a low pass filter responsive to the luminance noise power statistical characteristics indicative signal for smoothing region transitions.

16. The apparatus as claimed in claim 1 wherein the shape-adaptive luminance noise reducer comprises:

a local window segmentation unit responsive to the luminance component Y(i,j) for determining simlar pixels in a window about a considered pixel (i,j) to provide a shape adaptive signal W(i,j);

a similar pixel counter for determining a count N of the number of similar pixels in window W(i,j);

a local mean calculator responsive to the luminance component, window W(i,j) and count N for determining a local mean signal mean[Y(i,j)] of the luminance component;

a local standard deviation calculator responsive to the luminance component, the local mean signal, window W(i,j) and count N for determining a local standard deviation signal of the luminance component;

a MMSE gain calculator responsive to the local standard deviation signal and the luminance noise power statistical characteristics indicative signal for determining a minimum mean square error signal K(i,j); and a calculation unit for filtering the lumiminace component to determine a filtered luminance signal Y*(i,j) in accordance with the equation:

$$Y^*(i,j)=\text{mean}[Y(i,j)]+K(i,j)[Y(i,j)-\text{mean}[Y(i,j)]]. \quad (19).$$

17. The apparatus as claimed in claim 1, wherein said block-based decoded image signal further includes first and second chrominance components, said apparatus further comprising:

a shape-adaptive chrominance noise power estimator responsive to said chrominance components for estimating statistical characteristics of first and second chrominance pixels associated with said luminance pixel by using local window information associated with each said chrominance pixel to generate a corresponding chrominance noise power statistical characteristics indicative signal; and a shape-adaptive chrominance noise reducer for filtering each said chrominance component according to said corresponding chrominance noise power statistical characteristics indicative signal.

18. The apparatus as claimed in claim 17 wherein the shape-adaptive chrominance noise power estimator comprises:

a shape-adaptive windowing local standard deviation estimator responsive to said chrominance components and local window information associated with each said chrominance component for providing a local estimated standard deviation signal; and an additive noise statistical determiner responsive to the local estimated standard deviation signal for generating an additive noise statistical signal for determining the corresponding chrominance noise power statistical characteristics indicative signal.

19. The apparatus as claimed in claim 18 further comprising a multiplier operator responsive to the additive noise statistical signal for generating the corresponding chrominance noise power statistical characteristics indicative signal.

20. The apparatus as claimed in claim 18 wherein the additive noise statistical determiner is further responsive to a coding parameter signal for generating the additive noise statistical characteristics indicative signal.

21. The apparatus as claimed in claim 20 wherein the additive noise statistical determiner is a look-up table.

22. The apparatus as claimed in claim 18 futher comprising:

a chrominance components interpolator responsive to the chrominance components signal for interpolating the chrominace components signal from a first resolution to a resolution of the luminance components signal; and a chrominance components deinterpolator responsive to the local estimated standard deviation signal for deinterpolating the local estimated standard deviation signal to the first resolution of the chrominace components signal.

23. The apparatus as claimed in claim 17 wherein the shape-adaptive chrominance noise reducer comprises:

a local mean calculator responsive to the chrominance components signal Cu/Cv, a shape-adaptive signal W(i,j) determined from a window of pixels with similar characteristics to a considered pixel (i,j) of the chrominance components signal and a count N of the similar pixels in W(i,j) for determining a local mean signal mean[Cu/Cv(i,j)] of the chrominance components;

a local standard deviation calculator responsive to the chrominance components signal Cu/Cv, the local mean signal mean[Cu/Cv(i,j)], window W(i,j) and count N for determining a local standard deviation signal of the chrominance component;

a MMSE gain calculator responsive to the local standard deviation signal and the chrominance noise power statistical characteristics indicative signal for determining a minimum mean square error signal K(i,j); and a calculation unit for filtering the chrominance components signal Cu/Cv to determine a filtered chrominance signal Cu/Cv*(i,j) in accordance with the equation:

$$Cu/Cv^*(i,j)=\text{mean}[Cu/Cv(i,j)]+K(i,j)[Cu/Cv(i,j)-\text{mean}[Cu/Cv(i,j)]].$$

24. A method for reducing noise in a block-based decoded image signal including a luminance component, said method comprising the steps of:

analyzing each luminance pixel value of said luminance component according to a corresponding luminance pixel spatial context in a same frame of said image signal to classify the luminance pixel in a selected one of a plurality of predetermined image region classes associated with distinct image region spatial characteristics and to generate a corresponding selected region class indicative signal;

estimating, from said luminance component and said selected region class indicative signal, statistical characteristics of said luminance pixel by using shape-adaptive local window segmentation data associated with the luminance pixel, to generate a corresponding luminance noise power statistical characteristics indicative signal; and filtering said luminance component according to said luminance noise power statistical characteristics indicative signal.

25. The method of claim 24, wherein said distinct image region spatial characteristics includes edge, near edge, flat, near flat and texture spatial characteristics.

26. The method according to claim 24, wherein said block-based decoded image signal further includes first and second chrominance components, said method further comprising the steps of:

estimating, from said chrominance components, statistical characteristics of first and second chrominance pixels associated with said luminance pixel by using shape-adaptive local window segmentation data associated with each said chrominance pixel to generate a corresponding chrominance noise power statistical characteristics indicative signal; and filtering each said chrominance components according to said corresponding chrominance noise power statistical characteristics indicative signal.

27. The method as claimed in claim 26 wherein the step of estimating from said chrominance components comprises steps of:
determining a local estimated standard deviation signal in response to said chrominance components and local window information associated with each said chrominance component; and
generating an additive noise statistical signal in response to the local estimated standard deviation signal for determining the corresponding chrominance noise power statistical characteristics indicative signal.

28. The method as claimed in claim 27 wherein the step of generating an additive noise statistical signal is further responsive to a coding parameter signal.

29. The method as claimed in claim 27 further comprising steps of:
interpolating the chrominace components signal from a first resolution to a resolution of the luminance components signal; and
deinterpolating the local estimated standard deviation signal to the first resolution of the chrominace components signal.

30. The method as claimed in claim 26 wherein the step of estimating from said chrominance-components comprises steps of:
determining a local mean signal mean[Cu/Cv(i,j)] in response to the chrominance components signal Cu/Cv, a shape-adaptive signal W(i,j) determined from a window of pixels with similar characteristics to a considered pixel (i,j) of the chrominance components signal and a count N of the similar pixels in W(i,j);
determining a local standard deviation signal of the chrominance component in response to the chrominance components signal Cu/Cv, the local mean signal mean[Cu/Cv(i,j)], window W(i,j) and count N;
determining a minimum mean square error signal K(i,j) in response to the local standard deviation signal and the chrominance noise power statistical characteristics indicative signal; and
filtering the chrominance components signal Cu/Cv to determine a filtered chrominance signal Cu/Cv*(i,j) in accordance with the equation:

$Cu/Cv^*(i,j)=\text{mean}[Cu/Cv(i,j)]+K(i,j)[Cu/Cv(i,j)-\text{mean}[Cu/Cv(i,j)]].$ 31. The method as claimed in claim 24, wherein said step of analyzing comprises:
filtering a high frequency noise component of said luminance pixel value and providing a filtered luminance pixel value;
detecting a plurality of edges each responsive to the filtered luminance pixel value and providing a plurality of edge detect signals indicative of the presence of a respective edge;
detecting a strong edge characteristic responsive to each of the edge detect signals for providing a near edge (NE) signal if the plurality edge detect signals are indicative of a distinct near edge image characteristic and providing an edge (E) signal if the edge detect signals are indicative of a distinct edge image characteristic;

detecting a flat region characteristic responsive to each of the edge detect signals for providing a near flat (NF) signal if the edge detect signals are indicative of a distinct near flat (NF) signal if the edge detect signals are indicative of a distinct near flat image characteristic and providing a flat (F) signal if the edge detect signals are indicative of a distinct flat image characteristic; and
detecting a texture region characteristic responsive to the strong edge detecting and the flat region detecting for providing a texture signal.

32. The method as claimed in claim 31 wherein said step of detecting a strong edge characteristic comprises steps of: detecting a preliminary strong edge characteristic in response to the edge detect signals; and evaluating the preliminary strong edge characteristic to provide the near-edge signal and the edge signal.

33. The method as claimed in claim 32, wherein the step of evaluating the preliminary strong edge characteristic comprises comparing a signal indicating the preliminary strong edge characteristic to first and second predetermined thresholds indicating, respectively, a strong edge characteristic and a no edge characteristic and providing an output SE_out(i,j) for a given signal input in(i,j) in accordance with:

$$\text{out}(i,j) = \begin{cases} 1 & \text{if } \sum_{(n,m)\in W} \text{in}(i-n, j-m) \geq \text{Threshold1} \\ 0 & \text{if } \sum_{(n,m)\in W} \text{in}(i-n, j-m) \leq \text{Threshold2} \\ \text{in}(i,j) & \text{otherwise} \end{cases}$$

wherein W is a local window about a considered pixel (i,j) and Threshold1 and Threshold2 are the first and second predetermined thresholds respectively.

34. The method as claimed in claim 33, wherein said step of evaluating the preliminary strong edge characteristic comprises comparing the output signal SE_out(i,j) a predetermined threshold indicating a near edge characteristic and providing an output out(i,j) for an input in(i,j) in accordance with:

$$\forall (i,j) \in B, \text{NE\_out}(i,j) = \begin{cases} 1 & \text{if } \sum_{(i,j)\in B} \text{in}(i,j) \geq \text{Threshold} \\ \text{in}(i,j) & \text{otherwise} \end{cases}$$

wherein B is a predetermined block of pixels about a considered pixel (i,j) and Threshold is the predetermined threshold indicating the near edge characteristic.

35. The method as claimed in claim 34 further comprising the step of determining the near edge signal as the logical AND of the signal NE_out(i,j) and the negated signal SE_out(i,j).

36. The method as claimed in claim 31 wherein said step of detecting a flat region comprises steps of:
detecting a preliminary flat region characteristic in response to the edge detect signals;
determining an output signal in response to the preliminary flat region characteristic, the filtered luminance pixel value, two threshold values and, optionally a filtered chrominance component;
determining the flat signal in response to the output signal, the filtered luminance pixel value, two threshold values and, optionally, the filtered chrominance component; and
determining the near flat signal in response to the flat signal and the logical negation of the output signal.

37. The method as claimed in claim 24 wherein the step of estimating comprises:
- determining a local estimated standard deviation signal in response to said luminance component;
- generating an additive noise statistical signal in response to the local estimated standard deviation signal; and
- applying a weighting operator in response to the additive noise statistical signal and region class indicative signal for determining the luminance noise power statistical characteristics indicative signal.

38. The method as claimed in claim 37 wherein the step of generating the additive noise statistical signal is further responsive to a coding parameter signal.

39. The method as claimed in claim 37 further comprising the step of filtering the luminance noise power statistical characteristics indicative signal for smoothing region transitions.

40. The method as claimed in claim 24 wherein the step of estimating comprises steps of:
- determining similar pixels in a window about a considered pixel (i,j) to provide a shape adaptive signal W(i,j) in response to the luminance component Y(i,j);
- determining a count N of the number of similar pixels in window W(i,j);
- determining a local mean signal mean[Y(i,j)] of the luminance component, in response to the luminance component, window W(i,j) and count N;
- determining a local standard deviation signal of the luminance component in response to the luminance component, the local mean signal, window W(i,j) and count N;
- determining a minimum mean square error signal K(i,j) in response to the local standard deviation signal and the luminance noise power statistical characteristics indicative signal; and
- filtering the lumiminace component to determine a filtered luminance signal Y*(i,j) in accordance with the equation:

$$Y^*(i,j) = \text{mean}[Y(i,j)] + K(i,j)[Y(i,j) - \text{mean}[Y(i,j)]].$$

* * * * *